United States Patent [19]
Smith

[11] Patent Number: 6,020,877
[45] Date of Patent: Feb. 1, 2000

[54] CURSOR CONTROL DEVICE FOR USE WITH COMPUTER SYSTEM

[75] Inventor: Jerry R. Smith, Littleton, Colo.

[73] Assignee: ZPoint, LLC, Littleton, Colo.

[21] Appl. No.: 08/881,635

[22] Filed: Jun. 24, 1997

[51] Int. Cl.$^7$ .................................................. G06F 3/033
[52] U.S. Cl. ............................................ 345/157; 345/161
[58] Field of Search ................................... 345/156, 157, 345/160, 161, 167, 168

[56] References Cited

U.S. PATENT DOCUMENTS

| | | |
|---|---|---|
| 4,799,049 | 1/1989 | Avila ........................................ 345/157 |
| 5,432,530 | 7/1995 | Arita et al. . |
| 5,504,502 | 4/1996 | Arita et al. . |
| 5,635,955 | 6/1997 | Maynard, Jr. .......................... 345/157 |
| 5,914,702 | 6/1999 | Derocher et al. ....................... 345/157 |

*Primary Examiner*—Jeffery Brier
*Attorney, Agent, or Firm*—Timothy J. Martin; Michael R. Henson

[57] ABSTRACT

A keyboard with a cursor control device and a palm support which supports the palms while allowing the fingers to be placed in the typing position. The palm support is connected to the cursor control device which allows the user to maintain the fingers in the typing position while controlling the position of the cursor on the display screen with palm movements.

21 Claims, 6 Drawing Sheets

CURSOR CONTROL DEVICE FOR USE WITH COMPUTER SYSTEM

FIELD OF INVENTION

The present invention broadly relates to cursor control devices for use with computer systems. More particularly, the present invention concerns cursor control devices which are operative to direct a cursor across a computer's display screen and which are specially constructed to allow a user to control travel of the cursor while the user's fingers are maintained in a typing position on the computer's keyboard. To this end, the present invention contemplates that the cursor control device may be a unit which is separately attachable to, or incorporated into, the computer system's keyboard.

BACKGROUND OF THE INVENTION

Perhaps the most revolutionary technological development in recent years has been the personal computer. While the earliest computers date back many years, the personal computer as we know it today originated in the mid-1970's. By most standards, then, the history of the personal computer has been relatively short. The first personal computers were the "brain children" of small entrepreneurial companies, some of which are no longer in existence. While some would dispute who actually deserves credit for developing the first personal computer, it is these small enterprises which have become the precursors of virtually all personal computers available on the market today.

While the capacity of these early machines is minuscule by today's standards, these machines revolutionized the home and office personal computer industry. The performance capabilities of personal computers today are quite astonishing. The processor speed and memory capacity of today's generation of work horse computers far exceed those of previous generations and are increasing exponentially as technology rapidly develops. The vast majority of personal computers operate in a Windows® environment, which to many is a more user-friendly working environment. While MS-DOS is slowly dying a lingering death, with the expectation that it will eventually be superseded entirely, there are those who refuse to accept the transition due to a psychological dependence upon existing MS-DOS operations.

A virtual necessity of Windows-based operating systems is a pointing device which is employed to activate a cursor across the computer's display screen. The pointing device is typically in the form of either a mouse, a track ball, or a joystick. A mouse is a controller that is moved over a flat surface. As it moves, electrical pulses inform the computer of its exact change in position. The computer responds to this information by shifting a cursor across the display screen in a direction corresponding to motion of the mouse. By pointing the cursor on the screen to a selected icon and then "clicking" a switch on the mouse, the command represented by the selected icon is executed. Internal to the mouse device is a track ball that transmits rotary motion to two slotted disks which each contain a pair of light-emitting diodes and a pair of photodiodes. As the track ball rotates, light shines through slots on the disk and produces electric signals to the photodiodes, which signals correspond to changes in the mouse's coordinates. As the mouse moves, horizontal and vertical coordinates of the cursor change, thereby giving it a new position on the display screen. By verifying these coordinates, the computer learns the location of the cursor and can identify different icons in sections on the display screen. A track ball functions similarly to a mouse and may be employed as either a separate plug-and-play device, or contained within the computer's console.

Another type of pointing device, and one in which the present invention is particularly concerned, is generically referred to as a mini-joystick. Two types of mini-joysticks are currently available, one which incorporates strain gauge technology and one which incorporates force sensing resistor technology (FSR). With both of these types of devices, manipulation of the mini-joystick in a desired direction causes the cursor to travel across the computer's display screen in a corresponding direction. Where portable computers are particularly concerned, the mini-joystick has become quite popular in recent years. Mini-joystick modules are dual click-button pointing devices designed for integration into tight, cramped spaces within the computer's housing. Their slim profile requires less than 0.25" of mounting depth, much less than typical track balls or joysticks. On laptop computers, mini-joysticks are located between keys on the keyboard and are fingertip activated to deliver simultaneous 360° control of cursor direction and speed. Typically, a working region of the computer which is located adjacent to the keyboard includes a pair of depressible mouse buttons to provide additional cursor control in the Windows® environment.

The pointing devices discussed above, among others, are widely employed by computer users today. Despite the popularity of these devices, however, they do have their drawbacks. One drawback common to each of these pointing devices is that a user has to continually reposition his/her hands in order to effectively and efficiently operate the pointing device. As such, the user cannot maintain his/her hands in the conventional typing position on the keyboard during use of the pointing device. While this drawback is more evident with external pointing devices, such as the mouse discussed above, it is also quite pronounced with integrated pointing devices.

Accordingly, a need exists to provide a new and improved cursor control device which does not require fingertip manipulation during use. It would also be advantageous to provide such a new and improved cursor control device which allows a user to maintain his/her fingers in the conventional typing position on a keyboard during operation. The present invention is particularly directed to meeting these needs among others.

SUMMARY OF INVENTION

It is an object of the present invention to provide a new and useful cursor control device adapted for use with a computer system to direct a cursor across a display screen.

It is another object of the present invention to provide a new and useful cursor control device which allows a user to control movement of a cursor across a display screen while the user's fingers are maintained in a typing position on a keyboard.

A further object of the present invention is to provide a cursor control device which may be employed as a retrofit to existing computer systems. To this end, the cursor control device may be attached directly to a portion of an existing computer system or employed as a separate unit.

Yet another object of the present invention is to provide a new and useful keyboard, as well as a new and useful computer system, which incorporates the cursor control device.

In furtherance of these objectives, then, the cursor control device of the present invention is adapted for use with a computer system which includes a keyboard having an array of upwardly projecting keys contained in a keyboard region and a display screen adapted to display a cursor thereon. In operation, the cursor control device of the present invention is used to direct the cursor across the display screen.

The cursor control device comprises a pointing device adapted to electronically communicate with the display screen and operative upon actuation to generate control signals to the computer system. The computer system responds to these control signals to cause the cursor to travel across the display screen. A control plate is adapted to be positioned and supported in a region adjacent to the keyboard region for relative movement with respect to the array of keys such that a user's palms may be supported by the control plate when the user's fingers are placed in a typing position on the keys. The control plate is configured to engage the pointing device and responds to movement of the user's palms to actuate the pointing device such that travel of the cursor across the display screen may be selectively controlled. As such, the user is able to direct the cursor across the display screen while the user's fingers are maintained in the typing position on the keys.

In one embodiment, the computer system includes a margin portion located adjacent to the array of keys and the control plate is adapted to movably attach to this margin portion. Preferably, the pointing device is disposed in the margin portion and projects upwardly from an upper surface thereof, with the control plate attachable to the upper surface to engage the pointing device. Here, a padded layer may be disposed on the control plate to provide a cushioned support for the user's palms during operation of the keyboard. Alternatively, the pointing device could project from a lower surface of the margin portion with the control plate attachable to this lower surface to engage the pointing device.

In another exemplary embodiment of the present invention, the cursor control device includes a base support adapted to releasably dock to the keyboard with the control plate movably attachable to this base support. Here, it is preferred that the base support be provided with the pointing device. With this embodiment, the present invention also contemplates that the pointing device could project from either an upper or lower surface of the base support.

The present invention also relates to an improvement to a computer system wherein the computer system includes a keyboard having an array of upwardly projecting keys, a display screen operative to display a cursor thereon, and a pointing device in electronic communication with the display screen. Here, the improvement comprises the control plate, as discussed above, which is configured to engage the pointing device so that the user may direct the cursor across the display screen while the user's fingers are maintained in the typing position.

In order to mount the control plate to the margin portion, the control plate may be formed to include a pair of spaced-apart mounting holes that are each aligned along a respective mounting axis with a cooperative pair of installation holes formed in the margin portion. A fastening assembly is associated with cooperative ones of the mounting holes and installation holes. Each fastening assembly includes a first fastening element extending through cooperative ones of the mounting holes and installation holes and a second fastening element releasably engaged to the first fastening element. Preferably, each of the installation holes is wider than its associated first fastening element to allow perturbation of the fastening assembly and the control plate relative to the computer's margin portion. A resilient element is preferably associated with each fastening assembly and interposed between the control plate and the margin portion. The resilient elements operate to resist perturbation of the fastening assemblies relative to the margin portion and to resiliently urge the control plate into a neutral position on the margin portion.

With the foregoing in mind, then, it may be appreciated that the present invention also provides for a keyboard for use with a computer system to generate input data. Here, the keyboard comprises an array of keys each operative upon manipulation to generate selected input data to the computer system. The keys are contained in a keyboard region of the keyboard's housing and this housing preferably contains a margin portion located adjacent to the keys which is adapted to support a user's palms when the user's fingers are placed in the typing position on the keys. Incorporated into the keyboard is the pointing device and control plate, as discussed above, so that a user may direct the cursor across the computer system's display screen while the user's fingers are maintained in the typing position. The present invention is also directed to a new and useful computer system incorporating the cursor control device discussed above. Here, the computer system comprises an input device in the form of a keyboard having an array of keys to generate selected input data, a processor operative to receive the input data and generate output data according to a stored program, and an output device operative to receive the output data from the processor and to display results according thereto on a display screen.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention relates to a cursor control device which may be employed for use with computer systems. From the description to follow, it should be appreciated that the cursor control device of the present invention may take on a variety of different configurations and be utilized either with laptop computers or larger desktop computers. The cursor control device is particularly adapted for use with computer systems operating in a Windows® environment, or the like, to permit a user to easily direct a cursor across the computer system's display screen.

Figure 1:
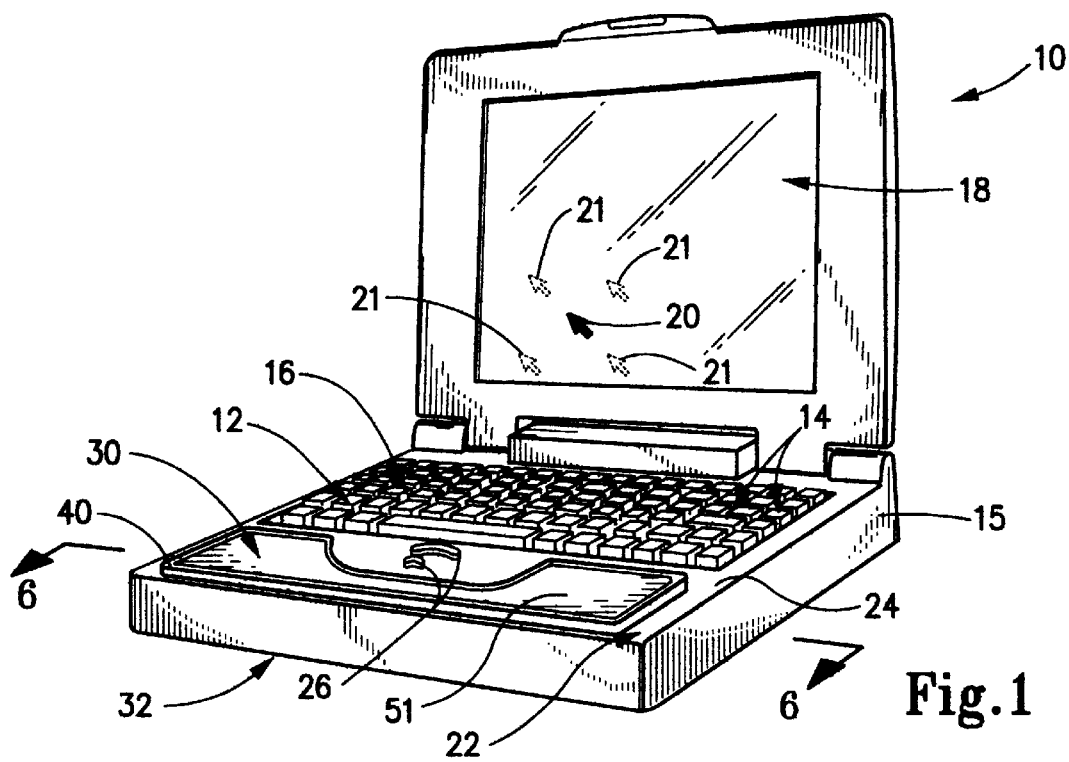
FIG. 1 is a perspective view of a computer system incorporating the cursor control device according to a first exemplary embodiment of the present invention.
Figure 2:
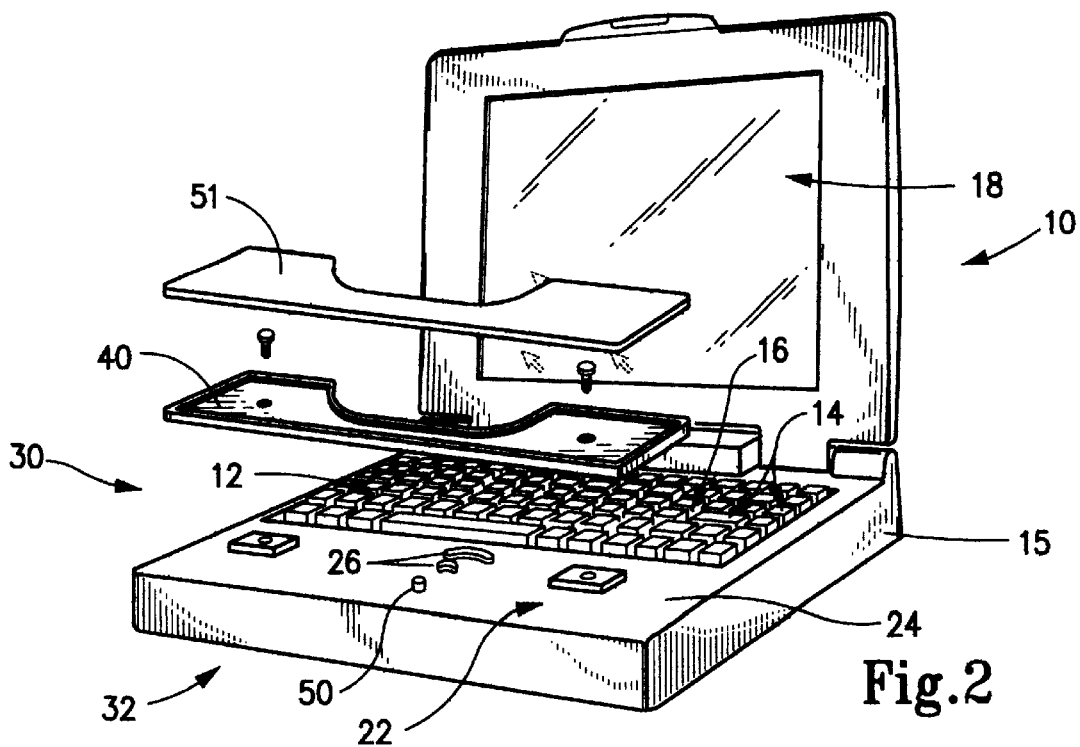
FIG. 2 is an exploded perspective view of the cursor control device shown in FIG. 1.

A first exemplary embodiment of the cursor control device of the present invention is generally introduced in FIGS. 1 and 2. Here, cursor control device 30 is shown used with a computer system 10 in the form of a laptop computer. Computer system 10 includes a keyboard 12 having an array of upwardly projecting keys 14 that are contained in a keyboard region 16 of the computer's housing 15. Computer system 10 also includes a display screen 18 which is adapted to display a cursor 20 thereon when the computer system 10 is running appropriate software applications.

Located immediately adjacent to the array of keys 14 is a margin portion 22 which is adapted to support a user's palms during operation of keyboard 12. Cursor control device 30 is movably attached to an upper surface 24 of this margin portion 22. Cursor control device 30 broadly includes a control plate 40 and a pointing device 50. As best shown in FIG. 2, pointing device 50 may be located in margin portion 22 to project upwardly from upper surface 24. Pointing device 50 is an integrated pointing device and is preferably in the form of a multi-directional, mini-joystick. Of course, the ordinarily skilled artisan should readily appreciate from the description to follow that pointing device 50 may be of a variety of different types available in the marketplace. Pointing device 50 is adapted to electronically communicate with display screen 18 and is operative upon actuation to generate control signals to computer system 10. Computer system 10 is operative in response to these control signals to cause the cursor 20 to travel across display screen 18. For example, and as best illustrated in FIG. 1, manipulation of the pointing device causes cursor 20 to travel to different locations, such as locations 21 on display screen 18.

Control plate 40 is adapted to be positioned in a region 32 adjacent to keyboard region 16. With this first exemplary embodiment, it may be appreciated that region 32 is defined by computer system's margin portion 22. Control plate 40 is mounted for relative movement with respect to keys 14 such that a user's palms may be supported by control plate 40 when the user's fingers are placed in the typing position on keys 14. Control plate 40 is configured to engage pointing device 50 and responds to movement of the user's palms to actuate the pointing device 50 such that travel of cursor 20 across display screen 18 may be selectively controlled. As such, the cursor control device 30 of the present invention is advantageous over prior known devices because it permits the user to navigate a cursor across a computer's display screen without the user's fingers ever leaving the typing position. This permits more efficient operation of the computer system and, where a laptop computer is employed, there is no need for external devices to control the cursor's movement.

Figure 3:
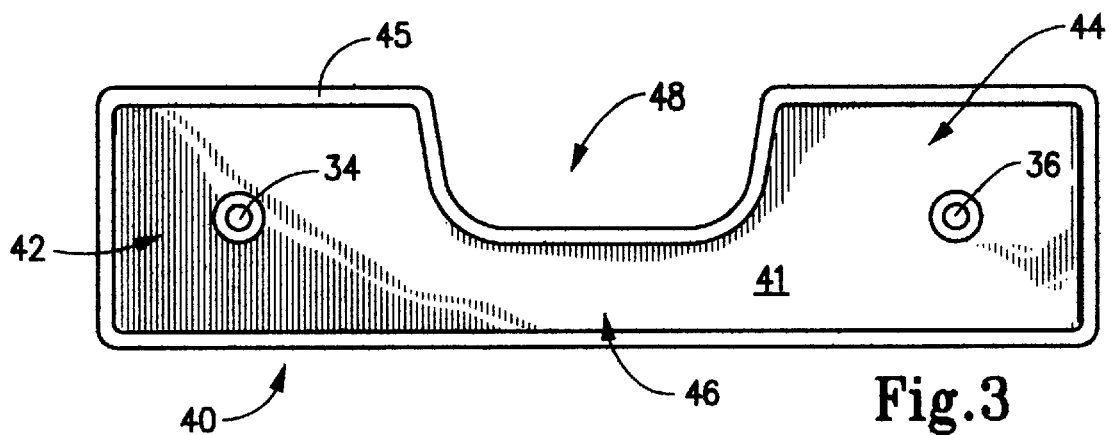
FIG. 3 is a top plan view of the control plate for the cursor control device shown in FIGS. 1 and 2.
Figure 4:
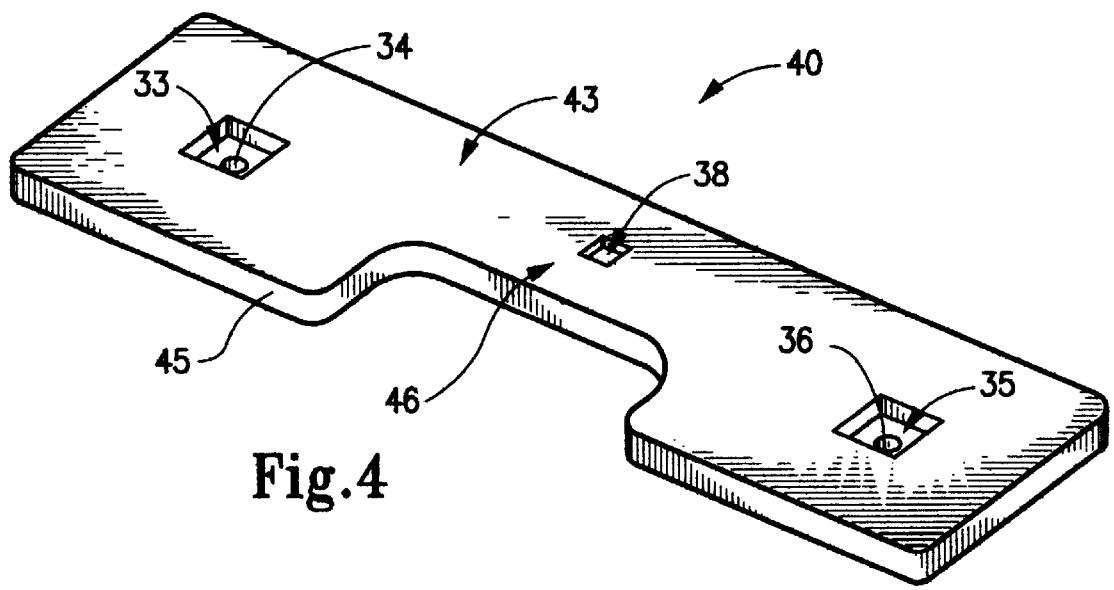
FIG. 4 is a perspective view showing a preferred construction for the bottom of the control plate.

A preferred construction for control plate 40 may best be appreciated with reference now to FIGS. 3 and 4. Control plate 40 is an elongated rigid member, preferably formed from plastic or the like, which is sized and adapted to movably attach to the computer system's margin portion. Control plate 40 may take on a variety of different configurations. It is preferred, however, that control plate 40 be contoured to fit on the computer system's margin portion to accommodate as little space as practicably possible without jeopardizing performance characteristics.

Where a laptop computer is employed having one or more cursor control push buttons, such as buttons 26 in FIGS. 1 and 2, control plate 40 may be contoured to provide access to these buttons. Control plate 40 may, therefore, be constructed to have left and right regions, 42 and 44 respectively, which are sized to accommodate the user's palms during use. A medial region of reduced width 46 may be located between left and right regions 42 and 44 to provide a central access area 48 for the computer system's push buttons 26. Although not by way of limitation, control plate 40 may also include an upright peripheral sidewall 45 to define a recessed upper surface area 41. A pair of space-apart mounting holes are formed through control plate 40 so that a first mounting hole 34 is located in left region 42 and a second mounting hole 36 is located in right region 44. Mounting holes 34 and 36 are preferably contoured such that the tapered head of a fastening element, such as a screw, may be nestably received therein, as will be discussed in greater detail below with reference to FIGS. 6 and 7.

Figure 5:
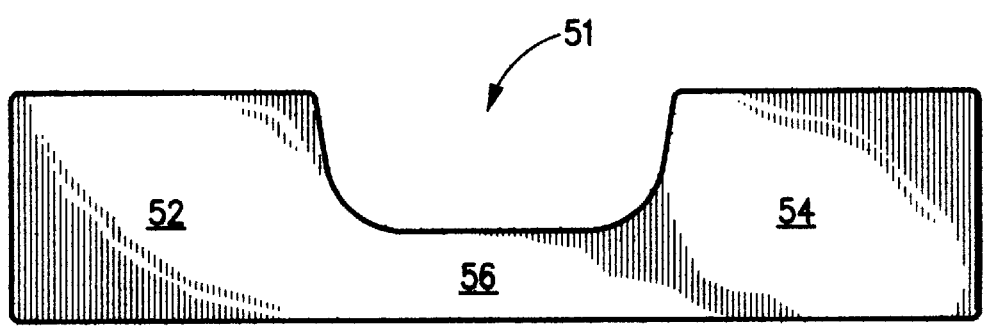
FIG. 5 is a top plan view of the padded layer shown in FIGS. 1 and 2 which may be employed for use with the cursor control device.

With specific reference to FIG. 4, the lower surface 43 of control plate 40 is formed to include an enlarged aperture associated with each of mounting holes 34 and 36, and coextensive therewith, so that a first aperture 33 is associated with first mounting hole 34 and a second aperture 35 is associated with second mounting hole 36. A cavity 38 is also formed in lower surface 43 in the control plate's medial region 46. Cavity 38 is sized to accommodate the pointing device 50 therein when control plate 40 is mounted to the computer system's margin portion 22, as shown in FIGS. 1 and 2. Although not by way of limitation, it is preferred that cavity 38 does not extend completely through control plate 40.

Where the cursor control device 30 of the present invention is movably attached to the upper surface 24 of margin portion 22, it is preferred that a padded layer 51 be used to provide a cushioned support for the user's palms during operation of the keyboard. This padded layer 51 is shown in FIGS. 1, 2 and 5. Padded layer 51, which may be formed from foam rubber or the like is specially contoured to mount onto the control plate's recessed upper surface area 41. To this end, and as shown in FIG. 5, padded layer 51 also includes a left region 52, a right region 54 and a medial region 56 of reduced width so that it is sized to mount to the control plate's upper surface 41 coextensively with peripheral sidewall 45. Padded layer 51 may, of course, be attached to upper surface 41 through the use of an adhesive or the like.

Figure 6:
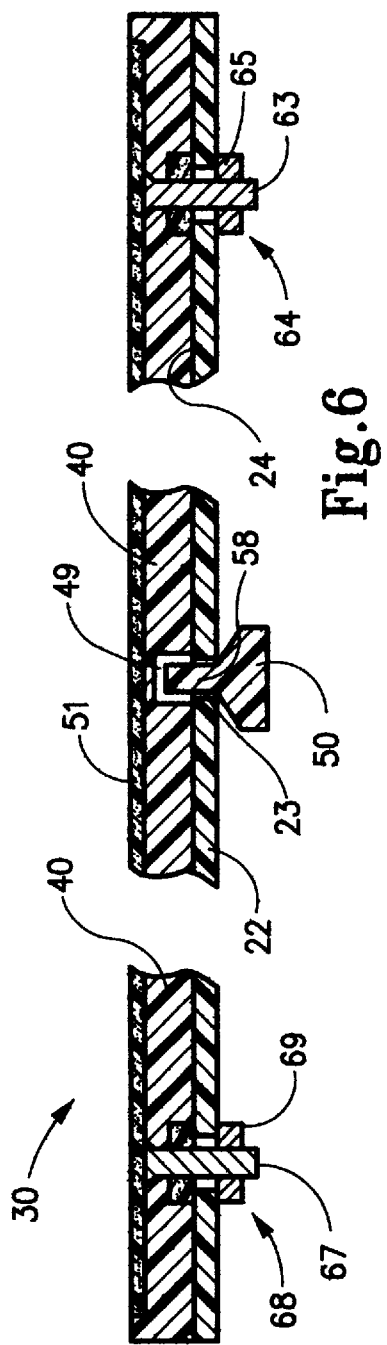
FIG. 6 is an enlarged side view in cross-section, and partially broken away, showing the attachability of the cursor control device to the computer system's margin portion, as viewed about line 6—6 in FIG. 1.
Figure 7:
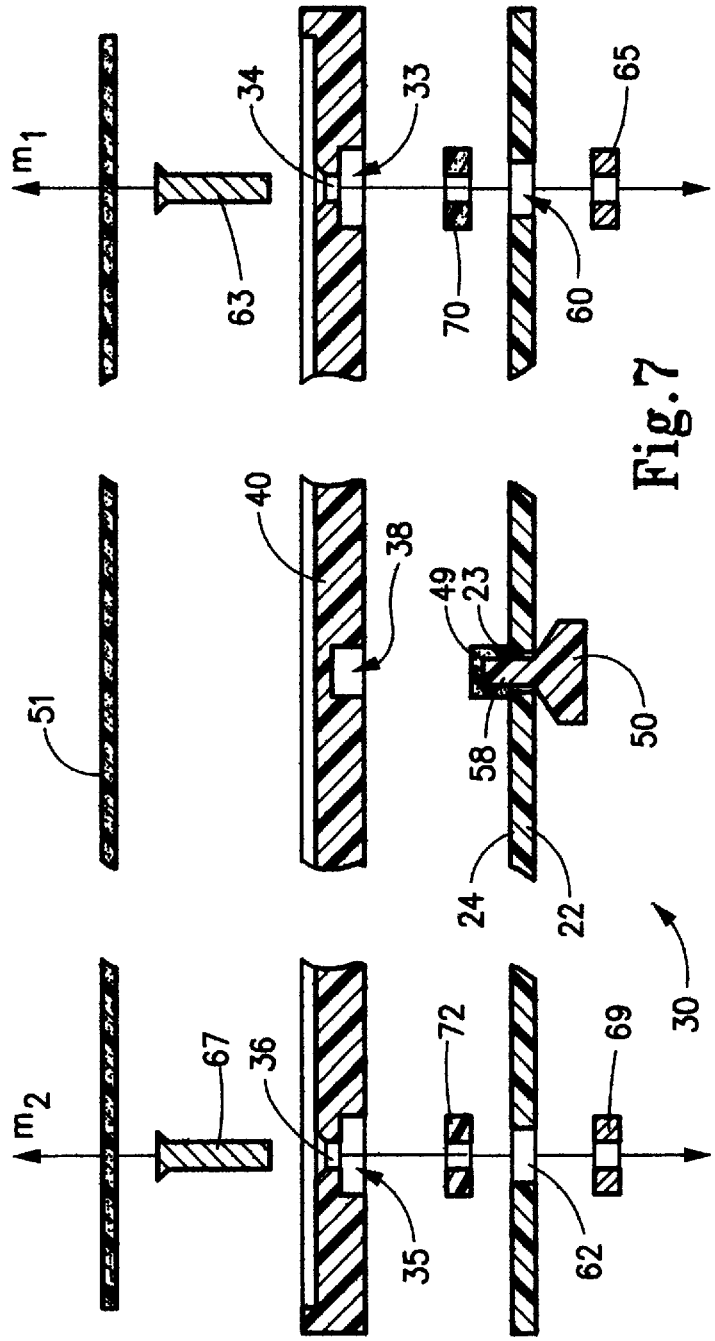
FIG. 7 is an exploded side view in cross-section also showing the attachability of the cursor control device to the computer system's margin portion.

The movable attachment of the cursor control device 30 to the computer system's margin portion 22 may best be appreciated with reference to FIGS. 6 and 7. Margin portion 22 is formed to include a pair of spaced-apart installation holes 60 and 62 which are formed into and extend through upper surface 24. Installation holes 60 and 62 are each aligned along a respective mounting axis with a cooperative one of the control plate's mounting holes 34 and 36. Accordingly, first installation hole 60 is aligned along mounting axis "$m_1$" with first mounting hole 34 and second installation hole 62 is aligned along a mounting axis "$m_2$" with second mounting hole 36. A fastening assembly is associated with cooperative ones of the mounting holes and installation holes so that a first fastening assembly 64 is associated with first mounting hole 34 and first installation hole 60, while a second fastening assembly 68 is associated with second mounting hole 36 and second installation hole 62.

Each of the first and second fastening assemblies 64 and 68 includes first and second fastening elements adapted to matably engage one another. More particularly, first fastening assembly 64 includes a first fastening element 63 in the form of a tapered head bolt, and a second fastening element 65 in the form of a nut, which is adapted to threadedly engage first fastening element 63. Second fastening assembly 68 likewise includes a first fastening element 67 in the form of a tapered head bolt, and a second fastening element 69, also in the form of a nut, which is adapted to threadedly engage first fastening element 67. Each of first fastening elements 63, 67 is sized and adapted to extend through associated ones of the first and second mounting holes 34, 36 and first and second installation holes 60, 62 to threadedly engage its associated second fastening element 65, 69, thereby to attach control plate 40 to margin portion 22. Thereafter, padded layer 51 is adhered to the control plate's upper surface 41 to provide the cushioned layer for the user's palms during operation of the keyboard.

As discussed hereinabove, control plate 40 is adapted to move relative to the keyboard's array of keys 14 when the control plate 40 is mounted on the computer system's margin portion 22. To accomplish this, installation holes 60 and 62 are formed to have an opening size that is larger than their respective first fastening elements 63, 67. It may be appreciated, then, that first installation hole 60 has a diameter larger than the diameter of first fastening element 63 and second installation hole 62 has a diameter larger than second fastening element 67. This permits the first and second fastening assemblies 64 and 68, as well as control plate 40, to move omni-directionally relative to margin portion 22.

While not a necessity, pointing device 50 may be provided with a resilient cap 49, and when control plate 40 is mounted to margin portion 22 as discussed, resilient cap 49 and a portion of the pointing device 50 is nestably received within cavity 38. Pointing device 50 may incorporate either strain gauge technology or force sensing resistor technology (FSR), as known in the art, so that deflection of pointing device 50 in any direction generates a control signal to the computer system which causes the cursor to travel across the display screen in a corresponding direction. It should be appreciated that, as control plate 40 moves, it engages pointing device 50 to deflect pointing device 50 in a desired direction thereby to selectively control travel of the cursor across the display screen. As shown in FIGS. 6 and 7, pointing device 50 projects through a hole 23 in margin portion 22, which hole 23 is wider than the tip 58 of pointing device 50 to permit deflection.

Each of FIGS. 6 and 7 illustrates the orientation of pointing device 50 when it is in a neutral position relative to margin portion 22. Once pointing device 50 has been deflected from this neutral position by virtue of movement of control plate 40, it is preferred to return pointing device 50 to this neutral position. One way to accomplish this is to provide resilient elements which are operative to resist perturbation of fastening assemblies 64 and 68 relative to margin portion 22 by resiliently urging control plate 40 into its neutral position on margin portion 22. To this end, resilient elements 70 and 72 are interposed between upper surface 24 of margin portion 22 and control plate 40. First resilient element 70 is sized and adapted to be received in first aperture 33 and first fastening element 63 extends through first resilient element 70. Likewise, second resilient element 72 is sized and adapted to be received in second aperture 35 and the first fastening element 63 extends therethrough. It can be appreciated, then, that movement of control plate 40 in a desired direction is resisted by resilient elements 70 and 72 thereby to urge pointing device 50 into its neutral position relative to margin portion 22. Of course, one of ordinary skill would appreciate that it is not necessary that fastening assemblies 64 and 68 extend through resilient elements 70 and 72. Rather, resilient urging of the control plate 40 into its neutral position could also be accomplished where resilient elements 70 and 72 are spaced apart from fastening assemblies 64 and 68 on upper surface 24.

Figure 9:
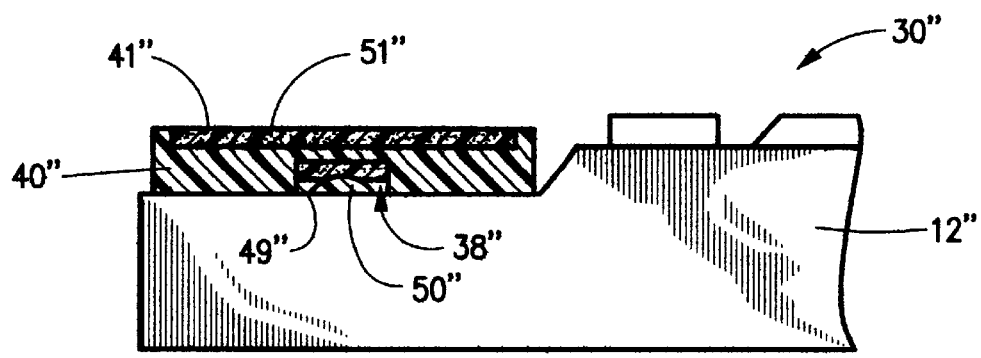
FIG. 9 is a side view in elevation and in partial cross-section illustrating a second alternative construction for the cursor control device according to the first exemplary embodiment of the present invention.
Figure 8:
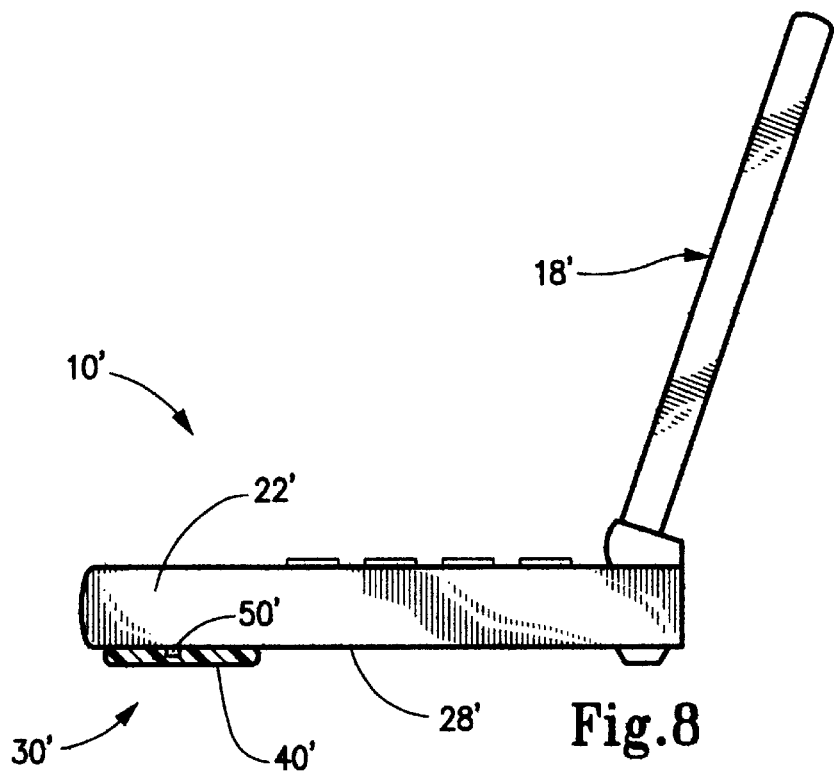
FIG. 8 is a side view in elevation of a first alternative construction for the cursor control device according to the first exemplary embodiment of the present invention, and specifically showing the cursor control device mounted to a lower surface of the computer system's margin portion.
Figure 10:
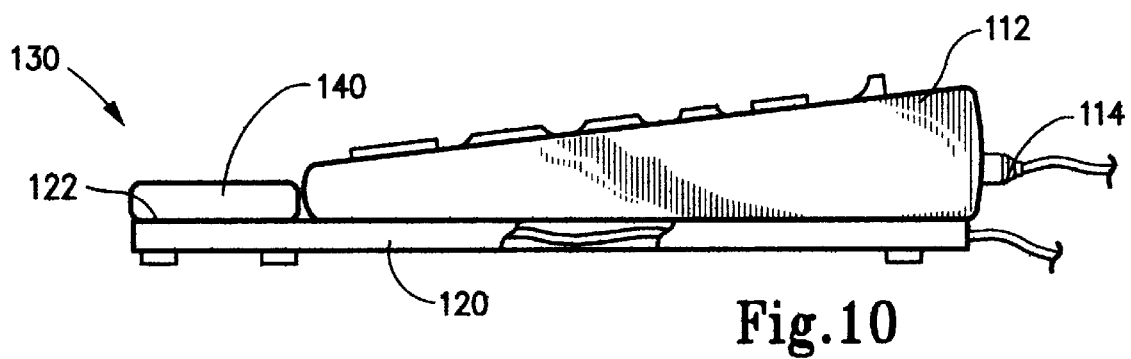
FIG. 10 is a side view in elevation illustrating the cursor control device according to a second exemplary embodiment of the present invention.

FIGS. 8 and 9 illustrate two alternative constructions for the cursor control device according to the first exemplary embodiment of the present invention. In FIG. 8, a first alternative construction is shown wherein the cursor control device 30' is shown movably attached to a lower surface 28' of margin portion 22'. With this construction, pointing device 50' necessarily projects downwardly from lower surface 28' and control plate 40' is attached to lower surface 28' in a similar manner as discussed above to engage pointing device 50'. With this construction, it may be appreciated that the user's palms are supported by both margin portion 22' and control plate 40' so that movement of the user's palms in a desired direction causes the control plate 40' to engage pointing device 50' and thereby to impart a corresponding movement of the cursor across the display screen 18' of the computer system 10'.

In FIG. 9, cursor control device 30" is constructed in many respects similar to cursor control device 30 discussed above. That is, cursor control device 30" comprises a pointing device 50" and a control plate 40". Pointing device 50" is adapted to electronically communicate with the computer system's display screen and is operative upon actuation to generate control signals to the computer system. With this second alternative construction, however, pointing device 50" is in the form of an integrated tracking ball as opposed to a mini-joystick. As above, control plate 40" is configured to engage pointing device 50" and responds to movement of the user's palms to actuate the pointing device 50" such that travel of the cursor across the display screen may be selectively controlled. With this construction, it is necessary that control plate 40" be configured to have a cavity 38" which is somewhat larger than cavity 38 discussed above so that cavity 38" is sized and adapted to accommodate the larger track ball. Preferably, a resilient member 49" is interposed in cavity 38" to engage pointing device 50" so that movement of control plate 40" in any direction translates into rotational movement of the track ball. As with before, a padded layer 51" may be disposed on an upper surface 41" of control plate 40" to provide a cushion support of the user's palms during operation of the keyboard 12".

A second exemplary embodiment of the cursor control device of the present invention is illustrated in FIGS. 10–13 where it may be seen that cursor control device 130 additionally includes a base support 120 that is adapted to releasably dock to a conventional keyboard 112. Control plate 140 is movably attached to an upper surface 122 of base support 120. The movable attachment is similar to that discussed above with reference to FIGS. 6 and 7. That is, base support 120 is formed to include a pair of spaced-apart installation holes 160 and 162 which each extend through base support 120 between its upper and lower surfaces, 122 and 124 respectively. First fastening assembly 164 includes a first fastening element 163, in the form of a screw, a first spacer bushing 157 and a first glide washer 165. First fastening element 163 is sized and adapted to be received through first spacer bushing 157, first glide washer 165 and first installation hole 160 to engage a threaded mounting hole 133 formed into the lower surface 144 of control plate 140.

Likewise, second fastening assembly 168 includes a second fastening element 167, in the form of a screw, which is sized and adapted to be received through a second spacer bushing 158, a second glide washer 169 and its associated second installation hole 162 to engage threaded mounting hole 135 formed in lower surface 144. First and second installation holes 160, 162 are larger in diameter than their cooperative mounting holes 133, 135 so that control plate 140 can move relative to base support 120 when in the mounted condition. Bushings 157 and 158 are provided so that their associated fastening elements can be tightened without pinching the bottom of control plate 140. Glide washers 165 and 169 are provided to reduce the amount of friction as control plate 140 moves relative to base support 120. Although not shown in FIG. 11, it should be readily appreciated that resilient elements could also be provided to permit resilient urging of control plate 140 into its neutral position on upper surface 122 of base support 120.

Figure 11:
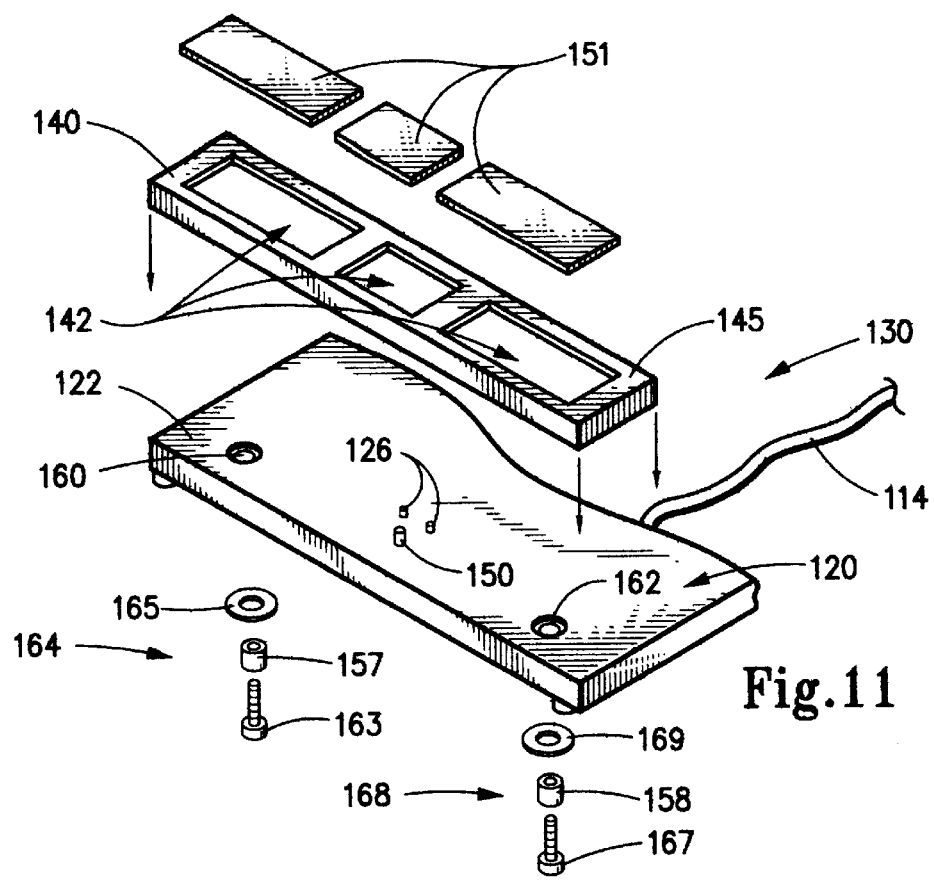
FIG. 11 is an exploded perspective view illustrating the cursor control device according to the second exemplary embodiment of the present invention.

With specific reference to FIG. 11, control plate 140 preferably includes a plurality of recessed regions 142 surrounded by a peripheral sidewall 145. Recessed regions 142 are sized and adapted to receive associated ones of a plurality of padded layers 151 to provide comfort to the user during operation of cursor control device 130. With specific reference to FIG. 13, a central cavity 138 is formed in lower surface 144 of control plate 140 to receive pointing device 150 such that movement of control plate 140 relative to base support 120 causes a deflection of pointing device 150 and translates into a corresponding movement of the cursor across the computer system's display screen.

Figure 12:
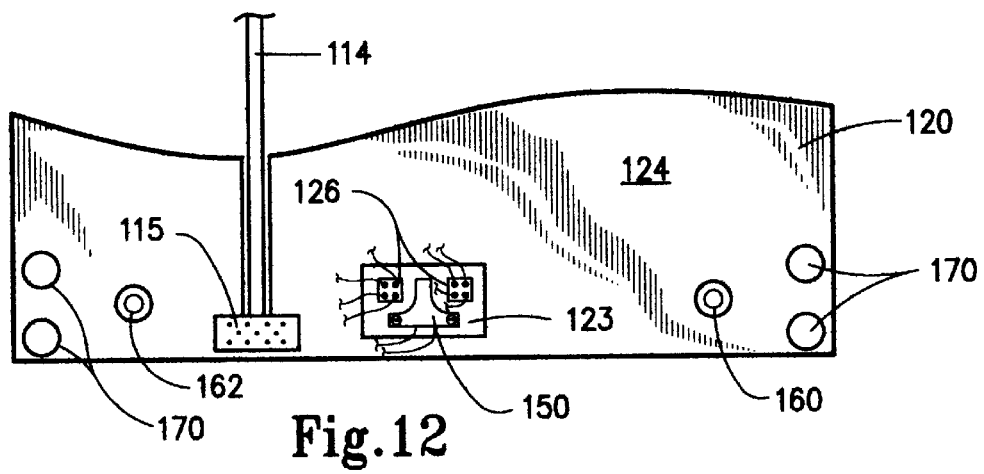
FIG. 12 is a bottom plan view of a portion of the cursor control device's base support shown in FIGS. 10 and 11.
Figure 13:
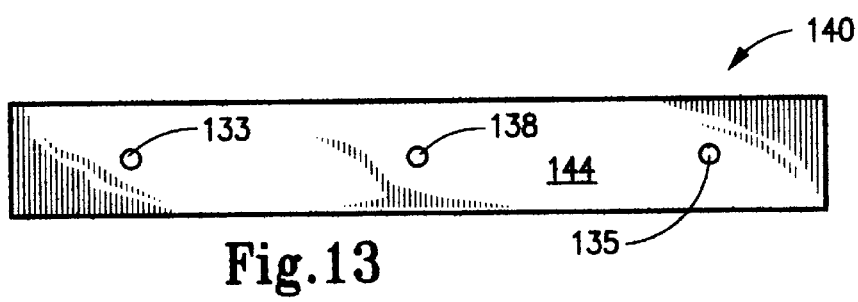
FIG. 13 is a bottom plan view of the cursor control device's control plate shown in FIGS. 10 and 11.

As best shown in FIGS. 11 and 12, the lower surface 124 of base support 120 also includes a cavity 123 within which pointing device 150 and push buttons 126 are mounted so that they project through the upper surface 122 of base support 120. As the ordinarily skilled artisan could appreciate, pointing device 150 and push buttons 126 may be electrically connected to an appropriate circuit board 115 whereby actuation of these elements is electronically communicated to keyboard 112, and ultimately the computer system, via serial connector 114 which plugs into the back of keyboard 112. Finally, a plurality of padded feet 170 may be disposed on lower surface 124 of base support 120 to stabilize the cursor control device 130 on an appropriate support surface.

Figure 14:
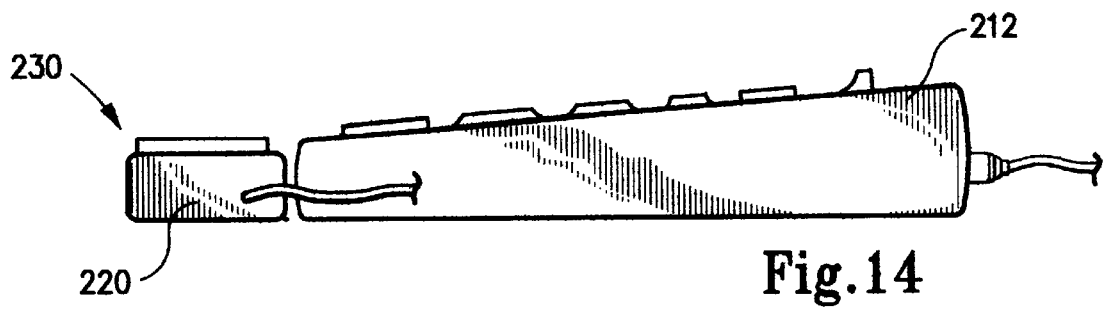
FIG. 14 is a side view in elevation illustrating the cursor control device according to a third exemplary embodiment of the present invention.

A third exemplary embodiment of the cursor control device according to the present invention is shown in FIG. 14. Here, cursor control device 230 is constructed similarly to cursor control device 120 discussed above with the exception that the base support 220 for cursor control device 230 is not adapted to dock to keyboard 212. Rather base support 220 is a separate unit which may be positioned in a region immediately adjacent to the keyboard 212 to provide a palm rest for the user during operation.

Figure 15:
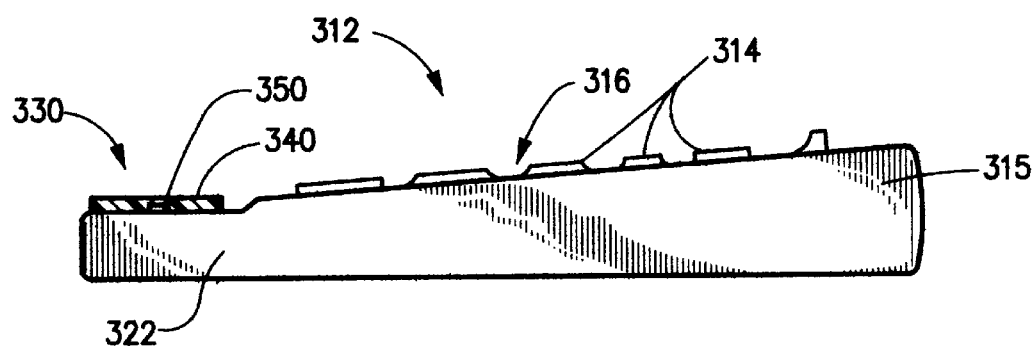
FIG. 15 is a side view in elevation illustrating a keyboard incorporating the cursor control device of the present invention.

With the foregoing discussion in mind relating to the preferred construction for the cursor control device according to the exemplary embodiments of the present invention, it may be appreciated by the ordinarily skilled artisan that the present invention also encompasses a new and useful keyboard, as well as a new and useful computer system, each of which may be constructed to incorporate the cursor control device. In FIG. 15, then, a keyboard 312 is shown having an array of keys 314 which are each operative upon manipulation to generate selected input data to a computer system. A housing 315 contains keys 314 in a keyboard region 316 thereof and housing 315 includes a margin portion 322 located adjacent to keys 314 which is adapted to support a user's palms when the user's fingers are placed in the typing position on keys 314. Cursor control device 330 is associated with keyboard 312 and includes a control plate 340 positioned and supported in a region adjacent to keyboard region 312. Control plate 340 is configured, as discussed above, to movably engage a pointing device 350 which operates upon actuation to generate control signals to a computer system.

Figure 16:
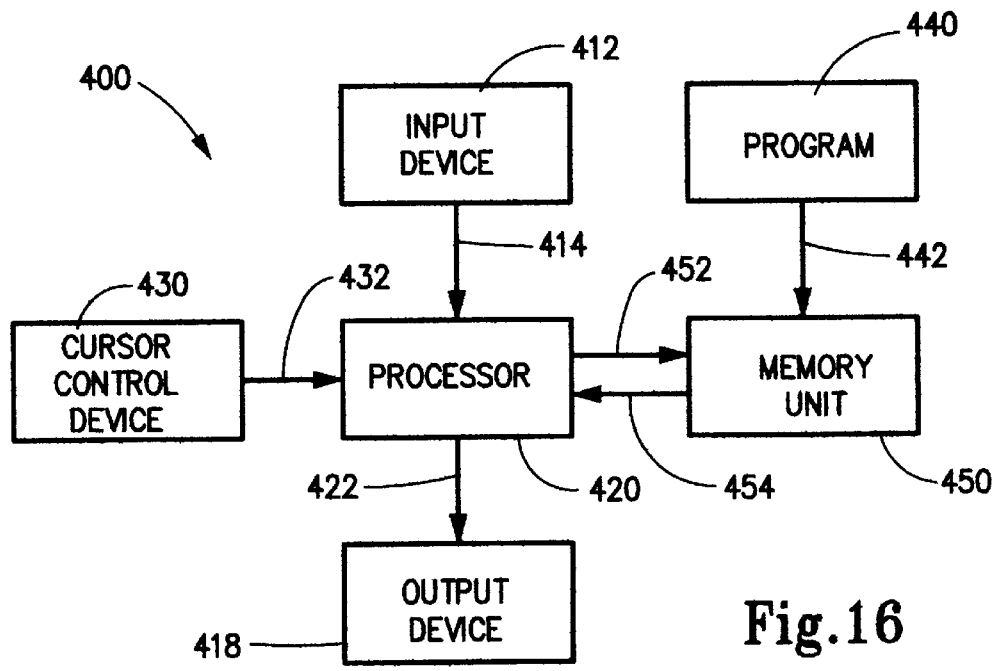
FIG. 16 is a block diagram showing a computer system incorporating a cursor control device according to any of the exemplary embodiments of the present invention.

The present invention also contemplates a computer system which may incorporate any of the cursor control devices discussed above. FIG. 16 graphically represents such a computer system. Here, computer system 400 includes an input device 412 which may be in the form of a keyboard provided with a plurality of keys that are each operative to generate input data, via data channel 414, to a processor 420. Processor 420 receives the input data from input device 412 and performs a desired function according to a stored program 440. As well known, a memory unit 450 is associated with the computer system 400. Memory unit 450 communicates with program 440, via communication line 442, and communicates information to processor 420 via communication channel 454. Processor 420 likewise communicates information via communication channel 452, to memory unit 450. An output device 418, such as a display screen, receives output data from processor 420 via communication channel 422 and displays the output data.

Also associated with computer system 400 is a cursor control device 430 which may be in any of the forms discussed above with reference to the exemplary embodiments of the present invention. That is, cursor control device 430 would include a pointing device that communicates with processor 420 via communication channel 432, which causes a cursor to move across the display screen of output device 418. Cursor control device 430 would also include the control plate discussed above with reference to the exemplary embodiments of the present invention, with the control plate operative to engage the pointing device to impart movement to the cursor across the display screen.

With the foregoing description in mind, the operation of the cursor control device according to any of the exemplary embodiments of the present invention may now be better appreciated. The cursor control device is adapted for use with a computer system having an array of upwardly projecting keys contained in a keyboard region and a display screen adapted to display a cursor thereon. When in operation, the cursor control device may be used to direct the cursor across the display screen. The cursor control device of the present invention has advantages over prior known devices in that it enables a user to direct the cursor's travel across the display screen while the user's fingers are maintained in the typing position. Accordingly, the user is able to type while simultaneously navigating the cursor across the display screen. This can be accomplished by the user by simply moving his/her palms in a desired direction and results in much more efficient operation of the computer system.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A cursor control device adapted for use with a computer system which includes a keyboard having an array of upwardly projecting keys contained in a keyboard region and a display screen adapted to display a cursor thereon, said cursor control device operative to direct the cursor across the display screen, comprising:
    (a) a pointing device adapted to electronically communicate with the display screen and operative upon actuation to generate control signals to the computer system, said computer system operative in response to said control signals to cause the cursor to travel across the display screen; and
    (b) a control plate adapted to be positioned and supported in a region adjacent to the keyboard region for relative movement with respect to the array of keys such that a user's palms may be supported by said control plate when the user's fingers are placed in a typing position on the array of keys, said control plate configured to engage said pointing device and responsive to movement of the user's palms to actuate the pointing device such that travel of the cursor across the display screen may be selectively controlled, thereby to allow the user to direct the cursor across the display screen while the user's fingers are maintained in the typing position.

2. A cursor control device according to claim 1 wherein said computer system includes a margin portion located adjacent to the array of keys and wherein said control plate is adapted to movably attach to said margin portion.

3. A cursor control device according to claim 2 wherein said pointing device is disposed in said margin portion and projects upwardly from an upper surface thereof, said control plate being attachable to said upper surface to engage said pointing device.

4. A cursor control device according to claim 3 including a padded layer disposed on said control plate to provide a cushioned support for the user's palms during operation of the keyboard.

5. A cursor control device according to claim 2 wherein said pointing device projects downwardly from a lower surface of said margin portion and wherein said control plate is attachable to said lower surface to engage said pointing device.

6. A cursor control device according to claim 1 including a base support adapted to releasably dock to said keyboard, said control plate movably attached to said base support.

7. A cursor control device according to claim 1 including a base support provided with said pointing device, said control plate movably attachable to said base support.

8. A cursor control device according to claim 7 wherein said pointing device projects upwardly from an upper surface of said base support and wherein said control plate is attachable to said upper surface.

9. A cursor control device according to claim 7 wherein said pointing device projects downwardly from a lower surface of said base support and wherein said control plate is attachable to said lower surface.

10. A cursor control device according to claim 1 wherein said pointing device is a multi-directional joystick.

11. A cursor control device according to claim 1 wherein said pointing device is a multi-directional track ball.

12. In a computer system including a keyboard having an array of upwardly projecting keys, a display screen operative to display a cursor thereon, and a pointing device in electronic communication with the display screen, wherein said pointing device is operative upon actuation to generate control signals to the computer system to cause the cursor to travel across the display screen, the improvement comprising a control plate positioned and supported in a region adjacent to the array of keys for relative movement with respect thereto such that a user's palms may be supported above said control plate when the user's fingers are placed in a typing position on the array of keys, said control plate configured to engage said pointing device and responsive to movement of the user's palms to actuate the pointing device such that travel of the cursor across the display screen may be selectively controlled, thereby to allow the user to direct the cursor across the display screen while the user's fingers are maintained in the typing position.

13. The improvement of claim 12 wherein the computer system includes a margin portion adjacent to the array of keys and wherein said pointing device projects upwardly from an upper surface of said margin portion, said control plate movably attached to said upper surface.

14. The improvement of claim 13 including a padded layer disposed on said control plate to provide a cushioned support for the user's palms during operation of the keyboard.

15. A cursor control device according to claim 13 wherein said control plate includes a pair of spaced-apart mounting holes that are each aligned along a respective mounting axis with a cooperative pair of installation holes formed in said margin portion.

16. A cursor control device according to claim 15 including a fastening assembly associated with cooperative ones of said mounting holes and said installation holes, each said fastening assembly including a first fastening element extending through cooperative ones of said mounting holes and said installation holes and a second fastening element releasably engaged to the first fastening element, thereby to releasably attach said control plate to said margin portion.

17. A cursor control device according to claim 16 including a padded layer disposed on said control plate to provide a cushioned support for the user's palms during operation of the keyboard.

18. A cursor control device according to claim 16 wherein each of said installation holes is wider than its associated said first fastening element to allow perturbation of said fastening assembly and said control plate relative to said margin portion.

19. A cursor control device according to claim 16 including a resilient element associated with each said fastening assembly and interposed between said control plate and said margin portion, said resilient element operative to resist perturbation of said fastening assembly relative to said margin portion and to resiliently urge said control plate into a neutral position on said margin portion.

20. A keyboard adapted for use in a computer system to generate input data, wherein said computer system includes an output device in the form of a display screen that is adapted to display a cursor thereon, said keyboard comprising:

(a) an array of keys each operative upon manipulation to generate selected input data to the computer system;

(b) a housing configured to contain said keys in a keyboard region thereof, said housing including a margin portion located adjacent to said keys which is adapted to support a user's palms when the user's fingers are placed in a typing position on said keys;

(c) a pointing device adapted to electronically communicate with said display screen and operative upon actuation to generate control signals to said computer system to cause the cursor to travel across the display screen; and (d) a control plate positioned and supported in a region adjacent to the keyboard region for relative movement with respect to the array of keys such that a user's palms may be supported by said control plate when the user's fingers are placed in a typing position on the array of keys, said control plate configured to engage said pointing device and responsive to movement of the user's palms to actuate the pointing device such that travel of the cursor across the display screen may be selectively controlled, thereby to allow the user to direct the cursor across the display screen while the user's fingers are maintained in the typing position.

21. A computer system, comprising:

(a) an input device in the form of a keyboard provided with an array of keys disposed in a keyboard region, each of said keys operative upon manipulation to generate selected input data;

(b) a processor operative to receive the input data and to generate output data according to a stored program;

(c) an output device operative to receive the output data from said processor and to display results according thereto on a display screen; and (d) a cursor control device operative to direct a cursor across said display screen, said cursor control device including:

(1) a pointing device in electronic communication with said display screen and operative upon actuation to generate control signals to said processor to cause the cursor to travel across the display screen; and (2) a control plate positioned and supported in a region adjacent to the keyboard region for relative movement with respect to the array of keys such that a user's palms may be supported by said control plate when the user's fingers are placed in a typing position on the array of keys, said control plate configured to engage said pointing device and responsive to movement of the user's palms to actuate the pointing device such that travel of the cursor across the display screen may be selectively controlled, thereby to allow the user to direct the cursor across the display screen while the user's fingers are maintained in the typing position.

* * * * *